INVENTORS
Josef Gammel
Kurt Huggle
BY
ATTYS.

3,437,933
ADJUSTABLE FOUR-POLE ATTENUATOR WITH CONSTANT INPUT RESISTANCE UTILIZING SEPARATELY HEATED THERMISTORS
Josef Gammel and Kurt Huggle, Munich, Germany, assignors to Siemens Aktiengesellschaft, a corporation of Germany
Filed Aug. 18, 1965, Ser. No. 482,323
Claims priority, application Germany, Aug. 21, 1964, S 92,749
Int. Cl. H04b 1/18
U.S. Cl. 325—415    2 Claims

ABSTRACT OF THE DISCLOSURE

A four-pole with adjustable attenuation transmission having a first separately heated thermistor disposed in the circuit as a series element and a second separately heated thermistor and a resistance in series therewith disposed in the circuit at the input side as a shunt element and a DC circuit containing said thermistors with the latter connected in parallel with respect to DC, said DC circuit producing a control potential for regulating the heating of the second thermistor to effect a constant input resistance.

---

Figure 1:
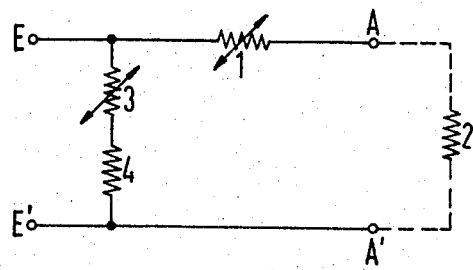

The invention relates to a four-pole attenuator having adjustable transmission attenuation, for electrical waves.

As an adjustable four-pole attenuator there is frequently utilized the so-called voltage divider circuit which, if a high expenditure is not permitted, has the drawback that the input resistance varies in dependence on the regulation of the attenuation value. Even with high expenditure it is not directly possible to keep the input resistance constant over a great regulating range.

The problem basic to the invention consists, among other things, in producing an adjustable four-pole attenuator which has a regulating range preferably of 30 to 40 db and an approximately constant input resistance.

This problem is solved according to the invention by the feature that the four-pole has a series resistance comprising an adjustable thermistor and a shunt resistance at the input side which comprises a series circuit containing a further adjustable thermistor having a resistance value which is determined by the value of the resistance terminating the four-pole, with the resistance values of the two thermistors being so controllable in opposite directions that the input resistance of the four-pole is at least nearly constant within the regulating range.

Expediently there are provided separately heated thermistors, whose heating systems are fed over two oppositely acting adjustable voltage dividers.

In further development of the invention, the two thermistors can be connected in parallel with respect to direct current. In this case, for the thermistor disposed in the cross branch, there may be provided a regulating amplifier to which there is fed, as a regulating voltage, the voltage drop of a measuring current on the direct current parallel circuit of the two thermistors, with the regulating circuit comprising the regulating amplifier and the two thermistors being so dimensioned that the input resistance of the four-pole attenuator remains at least approximately constant in dependence on the regulation of the thermistor in the longitudinal branch.

In connection with the invention it is contemplated that the four-pole attenuator may be used as an input attenuation member of a receiver for electrical waves, especially an ultrashort wave receiver, in such a way that it is inserted as a reverse regulated attenuation member between the antenna input and the first amplifier transistor of the receiver, and that as a regulating criterion for the separate heating of the thermistor arranged in the transmission path the information signal field strength is used by the method that the regulation of this thermistor takes place over the output voltage of an amplifier stage subsequent to the ZF selection.

The invention will be explained in detail with the aid of examples of construction illustrated in the drawings, in which:

FIG. 1 is a schematic diagram of a four-pole, illustrating the manner of regulation; and FIGS. 2–5 are schematic diagrams of respective embodiments of the invention.

FIG. 1 illustrates an adjustable four-pole attenuator having input terminals E and E′ and output terminals A and A′. Such four-pole has a series branch comprising a resistance representing an adjustable thermistor 1, and a cross branch which consists of the series circuit of another adjustable thermistor 3 and a resistor 4. The resistance values of the two regulating resistances 1 and 3 can be oppositely controlled, for the purpose of maintaining at least a very nearly constant input resistance of the four-pole, by effecting a corresponding increase of the resistance of the thermistor 1 when the resistance of the thermistor 3 is decreased. To the output terminals A–A′ of the four-pole there is connected a load resistance 2. The resistor 4 should have at least very nearly the value of the load resistance 2, if the input resistance of the four-pole is to remain substantially constant in dependence on the resistance change of the thermistor.

Figure 2:
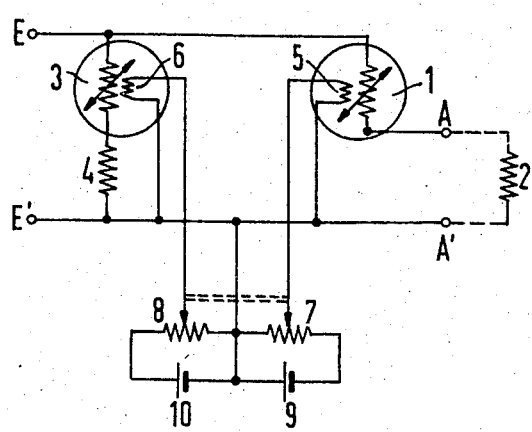

FIG. 2 illustrates an example of construction of an adjustable four-pole attenuator, in which the thermistor 1 is constructed as a separately heated thermistor with a heating system 5, and the thermistor 3 is constructed as a separately heated thermistor with a heating system 6. The resistance value of the thermistor 1 is determined by its heating system 5 and the resistance value of the thermistor 3 is determined by its heating system 6. The two heating systems 5 and 6 are supplied with current from the voltage sources 9 and 10 over the voltage dividers 7 and 8, such voltage dividers having such resistance characteristics and/or are so coupled mechanically that the resistance values of the two thermistors 1 and 3 can be oppositely controlled in such a way that the input resistance of the four-pole remains at least very nearly constant within the regulating range.

Figure 3:
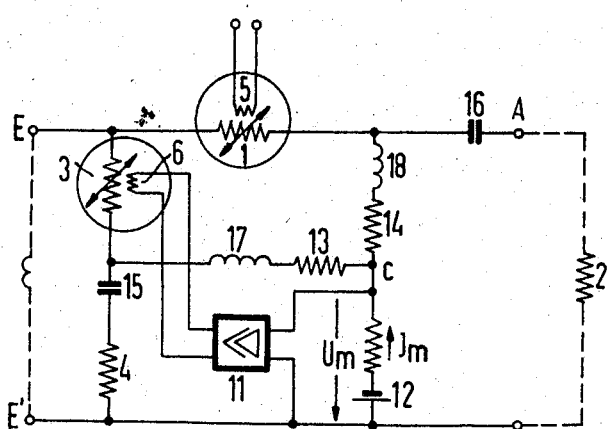

FIG. 3 illustrates an adjustable attenuation member in which the heating system 6 of the thermistor 3 lying in the input side cross branch of the four-pole is controlled over a regulating amplifier 11 by a measuring voltage drop in the attenuation member. The separately heated thermistor 1 increases its resistance from about 6 to about 1500 ohms for input signal voltages >0.2 mv. (EMK). The regulating magnitude for the heating current of the heating system 5 of the thermistor 1 is externally supplied. Since the load resistance 2 is about 25 ohms, with great input voltages there takes place a considerable voltage division. With small input signals, for constant input resistance the resistance of the thermistor 1 is very slight and the resistance of the thermistor 3 is correspondingly great, so that in this case the input signal is fed with very low losses to the load resistance 2.

The thermistor 3 has the function of balancing, over the resistor 4, the change of the HF input resistance of the four-pole attenuator at the input terminal E. For this purpose there is fed in at point C an impressed measuring direct current $I_m$ from the source 12, the current circuit of which is completed over the terminals E/E′. This measuring current brings about in the unregulated case, if, therefore, the thermistor 1 is at a low resistance and the thermistor 3 is a a high resistance, a very slight voltage drop. Now if, in the initiating of the regulation, the resistance of the thermistor 1 becomes high, the measuring voltage $U_m$ lying between reference potential E', A' and point C becomes greater. This voltage, however, creates in the regulating system for the thermistor 3, as a result of the regulating amplifier, a steep rise of the heating current of the heating system 6, so that the thermistor 3 becomes lower ohmic until there is again present the original direct voltage resistance value between point C and reference potential E', A', except for a preferably very low residual error. An additional residual compensation can take place through corresponding dimensioning of the resistor 4, and/or of the load resistance 2 and/or of the resistors in the measuring current path.

If the load resistance 2 in the input resistance of a transistor amplifier connected on the output side of the attenuating member, and if the resistor 4 has the magnitude of such transistor input resistance, then the HF input resistance of the four-pole, with regulation, will not change if the resistors 4, 13 and 14 have the same resistance value. The assumption there is that the resistance behavior of the thermistor is the same for high frequency currents and for direct currents. If the resistances involved are not free of phase shift, compensation may be effected by the utilization of reactance means.

For the separation of the alternating current path from the measuring direct current path there are provided capacitors 15 and 16, and chokes 17 and 18.

Figure 4:
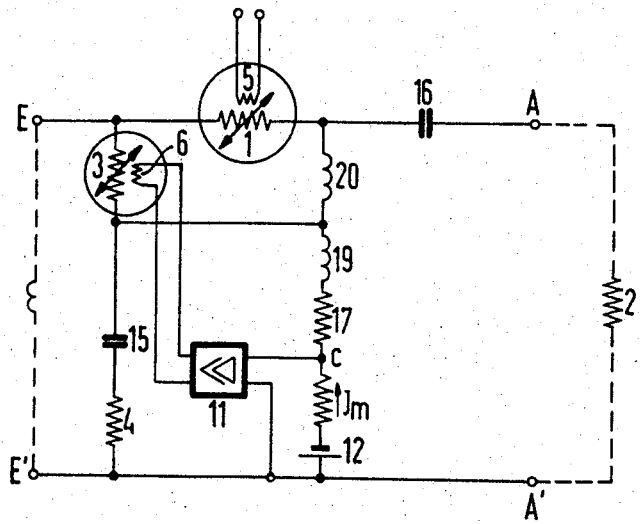

FIG. 4 illustrates a circuit which is modified as compared to FIG. 3, in which the compensation of the input resistance takes place, however, only approximately. Here, the resistors 14 and 13, in the direct current path, have been omitted from the circuits of the thermistors 1 and 3, both thermistors being connected in parallel with respect direct current and have a resistor 17 in common, into which the impressed measuring direct current $I_m$ is fed. The chokes 19 and 20 are here arranged in correspondance to the modified circuit.

Figure 5:
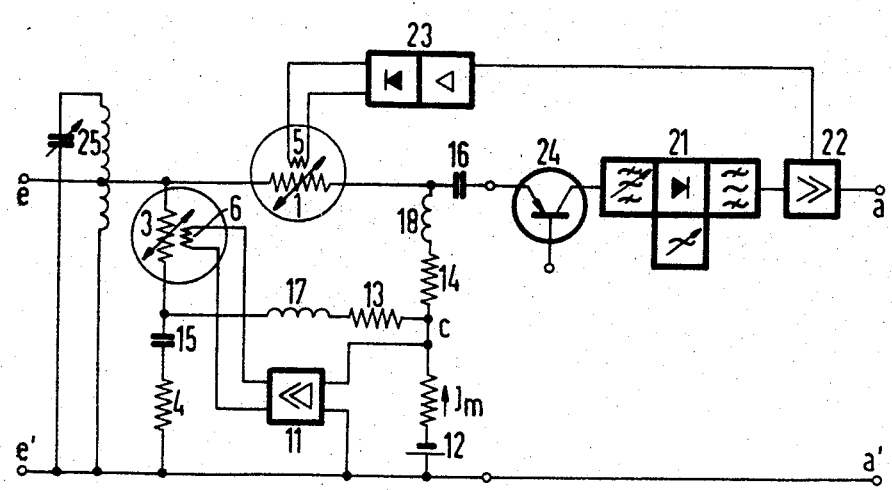

FIG. 5 illustrates a further development of an adjustable attenuation member according to FIG. 3, which may be utilized in receivers for very short electromagnetic waves, in particular ultrashort wave receivers. The regulating control magnitude for the heating system 5 is supplied by an amplifier stage 22, following the intermediate frequency amplifier 21 of the receiver, and conducted over an additional amplifier 23. The resistance of the separately heated thermistor 1 increases, for example, for the input signal voltage >0.2 mv. (EMK) from about 6 ohms up to about 1500 ohms. If the input resistance of the transistor 24 lies, for example, at about 25 ohms, then with large input voltages a considerable voltage division takes place. On the other hand, the input resistance for small input signals is sufficiently small, that the useful signal performance loss can increase the receiver noise level only in a negligibly slight degree. The manner of operation of the circuit otherwise corresponds to the circuit according to FIG. 3. The circuit for the measuring current $I_m$ is completed over the input circuit 25.

An ultrashort wave Ball receiver is tunable within its frequency band to the transmitted signal of an ultrashort wave transmitter disposed at a remote location. The received information signal is retransmitted to an ultrashort wave transmitter at the same location and retransmitted in amplified form offset somewhat in frequency. This signal appears at the input of Ball receiver, along with the signal delivered from the distant transmitter, as an interference signal, with an amplitude often many times that of the received signal. The reverse-regulated attenuation member here fulfills the function of so attenuating the useful signal lying on the antenna input, and fluctuating in amplitude, from a certain magnitude that the overcontrol stability of the transistor 24 and of the succeeding stages increases to the same degree as the input useful signal field strength exceeds the amount necessary for proper operation.

The adjustable attenuation fulfills in the receiver of the example of construction the following requirements: For signal voltages of small 0.2 mv. (EMK) the attenuation is sufficiently small, whereby the noise factor of the receiver is hardly affected. All the elements of the attenuation member behave as linear resistances with respect to the useful signal and interference voltages present at the receiver input, whereby undesired mixing processes are avoided. These linearity requirements are best fulfilled, in particular, by separately heated thermistors. The regulating range of the attenuation is so great that even with the greatest signal and interference voltages occurring no over control takes place.

The use of the invention in receiving installations is not by any means of importance only for transistorized units. The object of the invention, on the contrary, could be used to advantage in tube circuits.

Changes may be made within the scope and spirit of the appended claims which define what is believed to be new and desired to have protected by Letters Patent.

We claim:
1. A four-pole attenuator comprising a pair of input and output terminals respectively:
    a first adjustable separately heated thermistor connected in series between said input and output terminals,
    an output resistance connected across said output terminals,
    a branch connected in shunt with said input terminals and including a second adjustable separately heated thermistor and a resistance in series therewith,
    said series resistance having a value dependent upon the magnitude of said output resistance,
    a DC circuit including said first and second thermistors connected in parallel with respect to each other and having one end of said parallel circuit coupled to one of said input terminals,
    each of said thermistors having a heating system,
    a regulating amplifier having an output operatively connected to the heating system of said second thermistor,
    said amplifier having an input connected to the other end of said parallel circuit,
    said regulating amplifier and said thermistors maintaining the input resistance of the attenuation four-pole approximately constant.

2. A four-pole attenuator according to claim 1, wherein capacitors are disposed respectively in series with said series resistance and in series with the output of said four-pole, and wherein a choke is interposed in circuit between said amplifier input and said thermistors.

References Cited

UNITED STATES PATENTS 2,660,625    11/1953    Harrison     333—81 XR
2,811,695    10/1957    Drexler     333—17

WILLIAM C. COOPER, *Primary Examiner.*